SYSTEM FOR TRANSMITTING DIGITAL DATA VIA TELEPHONE LINES UTILIZING A TELEPHONE AS THE INPUT
Filed Sept. 2, 1964
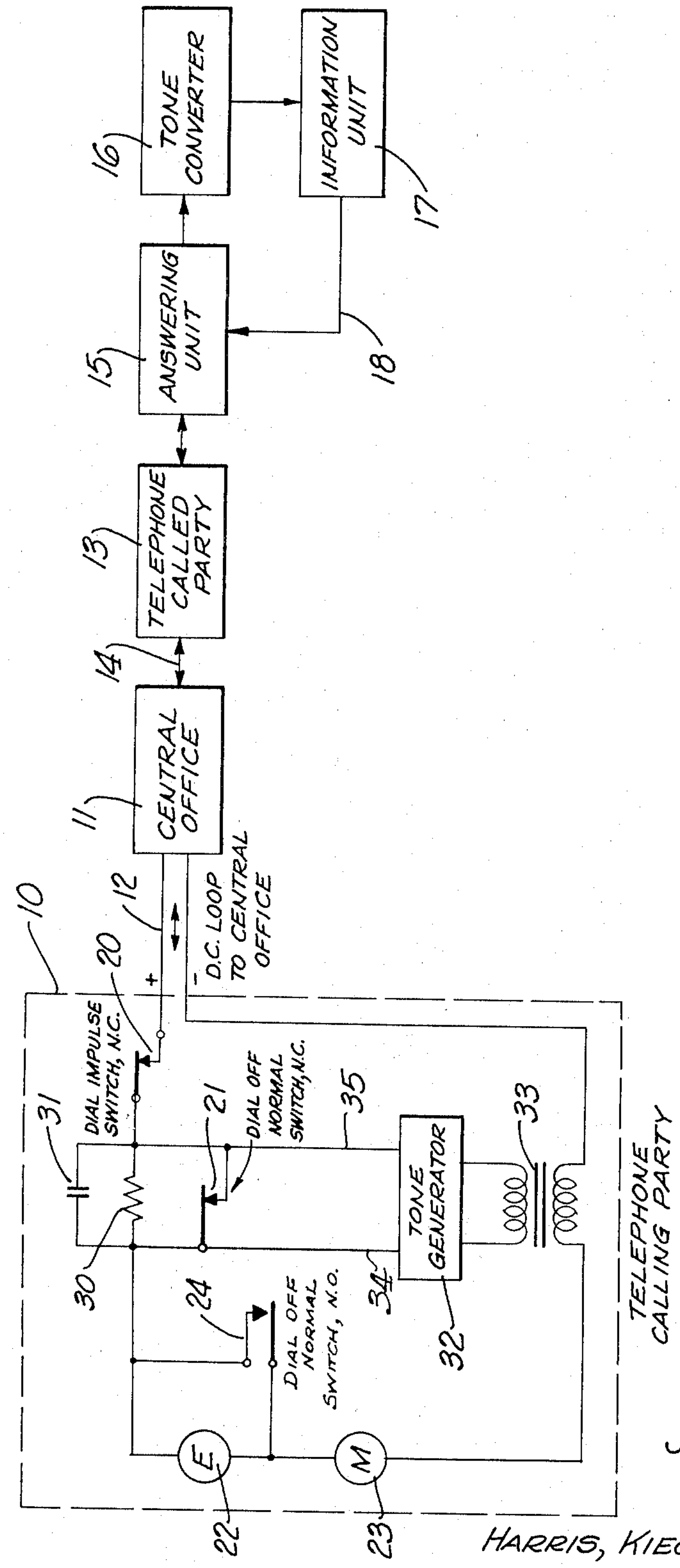
INVENTOR.
JOHN R. SCANTLIN
BY HIS ATTORNEYS
HARRIS, KIECH, RUSSELL & KERN United States Patent Office 3,371,162 Patented Feb. 27, 1968

3,371,162
SYSTEM FOR TRANSMITTING DIGITAL DATA VIA TELEPHONE LINES UTILIZING A TELEPHONE AS THE INPUT

John R. Scantlin, Los Angeles, Calif., assignor to Scantlin Electronics, Inc., Los Angeles, Calif., a corporation of Delaware Filed Sept. 2, 1964, Ser. No. 394,009
2 Claims. (Cl. 179—2)

ABSTRACT OF THE DISCLOSURE

The modification of the conventional telephone using existing keying, such as the dial or a plurality of push buttons, and using central office power and providing for digital data transmission between telephones. A tone generator added to a conventional telephone and energized from the central office D.C. power loop by dial switch closings to couple tone bursts onto the line to the central office for transmission to a called telephone.

This invention relates to data transmittal on telephone lines and, in particular, to systems which can be utilized by a calling party to transmit digital data by manual manipulation at the calling party's telephone.

In a typical application, the system of the invention may be utilized to permit a number of parties to enter data into a computer storage unit. In another typical application, the system may be utilized to permit individuals to transmit inquiries to an information unit, such as a computer memory, and to receive replies therefrom. In such installations, the information unit or computer is connected to a standard telephone unit, referred to herein as the called party unit. The calling party who wishes to transmit digital data to the called party first dials the number of the called party at the calling party's telephone unit and the two telephone units are interconnected in the usual manner through the telephone company's central office equipment. The calling party then dials additional digits comprising the message to be transmitted and this digital information is transmitted by means of the system of the invention through the central office equipment and through the called party's telephone unit to the information unit, computer or other equipment at the called party's telephone. This arrangement may be utilized to transmit information for storage, to transmit commands for execution at a computer, to transmit inquiries seeking responses, or for other digital transmission purposes.

In present day telephone systems, operation of the telephone dial causes interruptions of the current in a D.C. loop between the central office and the calling party's telephone, with the power source for the current being positioned at the central office. These interruptions produce D.C. pulses which are utilized at the central office to connect the calling party's telephone to the called party's telephone. These D.C. current pulses are not carried through the central office to the called party's unit and therefore cannot be used as a source of digital information transmission. Audible clicks do result in the called party's unit due to dialing at the calling party's unit after the connection is established, but utilization of these clicks for information transmission is not practical because of lack of reliability in detection under varying circuit conditions.

It is an object of the present invention to provide a system for transmitting a digital signal via telephone lines including a calling party telephone unit, a called party telephone unit, a central office, lines for interconnection of the calling and called parties through the central office, a tone generator at the calling party unit for coupling tones onto the line to the central office and including means for keying the tones on the line with the tones corresponding to calling party digits, a tone converter for converting input tones to digital data, and means for connecting the line of the called party to the tone converter input when the called unit is called.

It is a particular object of the invention to provide such a system which can be utilized with present day dial telephones permitting the calling party to manually generate the digital signal by dialing digits after the desired connection is completed through the central office. A further object is to provide such a system which can be utilized with the push button type of telephones now being used on an experimental basis. An additional object is to provide such a system which can utilize any of the conventional automatic answering equipment at the called party telephone unit for automatically answering and connecting the called unit to the tone converter and/or other terminal equipment.

It is an object of the invention to provide such a system which can provide merely for one-way transmission from the calling party to the called party and a system which can provide for transmission of responses from the apparatus served by the called party to the calling party. A particular object is to provide such systems which can handle responses in digital form for display or conversion at the calling party unit and in audible speech form for listening and/or recording by the calling party.

Other objects, advantages, features and results will more fully appear in the course of the following description. The drawing shows a preferred embodiment of the system of the invention which is given by way of illustration or example.

The telephone unit 10 of the calling party is connected to the telephone company central office 11 by a conventional line 12. Any number of calling party telephones may be utilized. The called party telephone unit 13 is connected to the central office 11 in the same manner by line 14. An answering unit 15 provides for connecting the telephone 13 to a tone converter 16. When replies are to be transmitted, the answering unit 15 also provides for connecting replies from an information unit 17 to the telephone 13.

The telephone 10 of the calling party may be a conventional telephone with certain modifications to be described. When the calling party is ready to dial, a D.C. loop is closed from a D.C. power source in the central office through one conductor of the line 12, a normally closed dial impulse switch 20, a normally closed dial off-normal switch 21, an earphone 22, a microphone 23 and the other conductor of the line 12. When the dial is moved from its normal position, a normally open dial off-normal switch 24 is closed, shunting the earphone 22 to block dialing noises from the calling party's ear.

A resistor 30 and a capacitor 31 are connected in parallel with the switch 21. A tone generator 32, which may be a simple audio frequency oscillator, is provided at the telephone 10 and may be installed within the instrument. The output from the tone generator is coupled to the primary winding of an output transformer 33 and the secondary winding is connected in series in the D.C. loop previously described. Energy for operating the tone generator may be provided from the D.C. loop by connecting the power supply lines 34, 35 of the tone generator across the resistor 30. When the switch 21 is closed, the resistor 30 is shunted and zero voltage is applied to the tone generator. When the switch 21 is open and the switch 20 is closed, the voltage developed across the resistor 30 is supplied to the tone generator 32 providing an output tone at the transformer 33. The capacitor 31 serves to pass audio signals around resistor 30 big enough to keep D.C. on the oscillator between dial pulses since some types of transistor audio oscillators are slow-starting. The switch 21, resistor 30, capacitor 31, tone generator 32 and transformer 33 are not found in the conventional telephone unit and would have to be added to the telephone of any telephone company customer desiring the service provided by the system of the present invention.

The telephone 13 of the called party can be a conventional telephone with a provision for connecting the line 14 on to the terminal equipment. This connection is performed by the answering unit 15 and in one embodiment could be a manually operated switch which is closed after the hand set is uncradled. However, it is preferred to use one of the conventional automatic answering units which will automatically connect the line 14 on through to the tone converter 16 when the called party is connected through to a calling party via the central office.

The tone converter may be a conventional electrical circuit which converts tone pulses of the type produced by the tone generator 32 to D.C. pulses or to any other conventional form of digital data as required for the particular information unit utilized. A wide variety of computers are currently available for information storage, command execution, information lookup, composition of messages in response to inquiries, and the like. Any worker skilled in the input-output phase of computer design and operation can readily provide a specific tone converter.

In the operation of the system described above, the calling party uncradles his hand set and then dials the number of the called party. The calling party is connected through to the called party in the conventional manner. When the ringing pulse arrives at the called party's telephone, the answering unit will respond and connect the calling party through to the tone converter. The calling party then dials the digital data which he wishes to transmit. The tone generator 32 is keyed by the dial impulse switch 20 producing tone pulses on the line 12, with the number of pulses in a group corresponding to the digit being dialed. The same groups of tone pulses are produced when the calling party is dialing the number of the called party but these have no effect on the operation of the system as the central office responds only to the D.C. pulses produced by the switch 20. However, after the connection is established between the two telephones, the subsequent tone pulses produced by dialing are transmitted on to the tone converter. Any number of digits may be transmitted and the transmission may be terminated by utilization of a particular stop code or merely by hanging up at the calling end.

In certain applications, the system may be utilized to transmit responses back to the calling party. The information unit 17 may be any of the conventional computers which compose a message in response to an inquiry, with the message being transmitted on an output line 18 and through the telephone 13 and central office 11 to the calling party's telephone 10. The reply message may be in digital form utilizing tone pulses and a converter and printer or other display equipment can be provided at the calling party's unit. However, it is preferred to transmit the reply messages in audible speech form so that the calling party can hear the reply in his hand set. An apparatus for generating audible speech messages from stored data for transmission on a telephone line is shown in U.S. Patent No. 3,082,402. Such a unit can be used in the present system for providing audible speech replies.

In a typical application of the system of the invention, the information unit may contain data regarding the credit ratings and/or bank balances of individuals and companies in a community. The calling parties may be the merchants of the community. Each merchant can be provided with one of the telephone units. The companies and persons about whom data is stored in the information unit can be identified by code numbers or names. When a merchant desires information, he first dials the number of the information unit telephone and then dials the appropriate code number. The system may be set up to provide a response after a certain number of digits have been transmitted. Alternatively, the merchant may also dial a code indicating the particular information desired and/or a code indicating the end of the message. The data is transmitted through the system to the information unit where the response is prepared and transmitted back to the merchant. Various other uses for the system will be apparent.

While the system has been described herein as operated with a dial telephone system, the system is also useable with the newer push button type of telephone which generates audiofrequency tones instead of dial impulses, with a different frequency or different combination of frequencies for each digit. With this type of equipment, the tone generators provided in the telephone unit by the telephone company can be utilized to provide the tones for transmitting through the called party's telephone to the tone converter.

While the tone generator 32 is shown as energized from the central office equipment, it does not have to be and a separate power source can be provided therefor. Various arrangements may be utilized for keying the tone generator in addition to that shown in the drawing.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a system for transmitting a digital signal via telephone lines, the combination of:

- a calling party telephone unit including keying means for generating a called party code;
- a called party telephone unit;
- a central office including a D.C. power source;
- lines for connecting said telephone units to said central office, said central office including means for connecting D.C. power onto the line to the calling party unit and means for interconnecting the calling and called party lines;
- a tone generator at said calling party unit energized by the D.C. power on the line from the central office and having the A.C. output thereof coupled onto such line;
- means actuated by said keying means for connecting said D.C. power to said generator for turning said generator on and off to produce tone pulses corresponding to calling party digits;
- a tone converter for converting input tone pulses to digital data; and
- means for connecting the line of said called party to said tone converter input when the called unit is called.

2. A system as defined in claim 1 in which said keying means comprises a telephone dial.

References Cited

UNITED STATES PATENTS

| | | | |
|---|---|---|---|
| 3,131,259 | 4/1964 | Di Torio et al. | 179—2 |
| 3,133,268 | 5/1964 | Avakian et al. | 179—2 X |
| 3,184,554 | 5/1965 | Meacham et al. | 179—84 |

OTHER REFERENCES

Sokoler, R., "A Low-Speed Data Set for High-Speed Business." In Bell Laboratories Record, vol. 40, No. 3, March 1962, pp. 74–80.

JOHN W. CALDWELL, *Primary Examiner.*

J. T. STRATMAN, *Assistant Examiner.*